(12) United States Patent
Li

(10) Patent No.: US 11,437,806 B2
(45) Date of Patent: Sep. 6, 2022

(54) PROTECTION OF AN ELECTRICAL APPARATUS

(71) Applicant: Eaton Intelligent Power Limited, Dublin (IE)

(72) Inventor: Huaqiang Li, Menomonee Falls, WI (US)

(73) Assignee: Eaton Intelligent Power Limited, Dublin (IE)

( * ) Notice: Subject to any disclaimer, the term of this patent is extended or adjusted under 35 U.S.C. 154(b) by 342 days.

(21) Appl. No.: 16/839,265

(22) Filed: Apr. 3, 2020

(65) Prior Publication Data
US 2020/0389011 A1    Dec. 10, 2020

Related U.S. Application Data

(60) Provisional application No. 62/857,611, filed on Jun. 5, 2019.

(51) Int. Cl.
*H02M 3/26* (2006.01)
*H02H 3/26* (2006.01)
*H02H 1/00* (2006.01)

(52) U.S. Cl.
CPC .......... *H02H 3/265* (2013.01); *H02H 1/0007* (2013.01)

(58) Field of Classification Search
CPC ....... H02H 3/265; H02H 1/0007; H02H 3/083
See application file for complete search history.

(56) References Cited

U.S. PATENT DOCUMENTS

| 2,984,799 A | * | 5/1961 | Gerks | H03H 11/22 323/213 |
| 2013/0054204 A1 | * | 2/2013 | Zhang | H02J 3/26 703/2 |
| 2015/0088439 A1 | * | 3/2015 | Coffrin | H02J 3/007 702/60 |

OTHER PUBLICATIONS

"The Effects of Available Short-Circuit Current on AC Drives," Data Bulletin 8800DB0801, Schneider Electric USA (2008).
(Continued)

*Primary Examiner* — Adolf D Berhane
*Assistant Examiner* — Afework S Demisse
(74) *Attorney, Agent, or Firm* — DiBerardino McGovern IP Group LLC

(57) ABSTRACT

An electrical apparatus configured to electrically connect to a multi-phase alternating current (AC) electrical power distribution network includes: an input electrical network including: a plurality of input nodes, each configured to electrically connect to one phase of the multi-phase AC electrical power distribution network; at least one non-linear electronic component electrically connected to the input electrical network; an impedance network electrically connected between the input electrical network and ground; and a control system configured to: access a voltage signal that represents a voltage over time at the input electrical network; determine a frequency content of the voltage signal; determine a property of the frequency content; and determine whether an input current performance condition exists in the electrical apparatus based the property of the frequency content.

19 Claims, 9 Drawing Sheets

(56) References Cited

OTHER PUBLICATIONS

"Variable Frequency Drives and Short-Circuit Current Ratings," Data Bulletin 8800DB1203R01/17, Schneider Electric USA (2017).
Lee et al., "DC Bus Electrolytic Capacitor Stress in Adjustable-Speed Drives under Input Voltage Unbalance and Sag Conditions," Conference Record of the 2004 IEEE Industry Applications Conference, 39th IAS Annual Meeting, vol. 4, pp. 2560-2567 (2004).

* cited by examiner

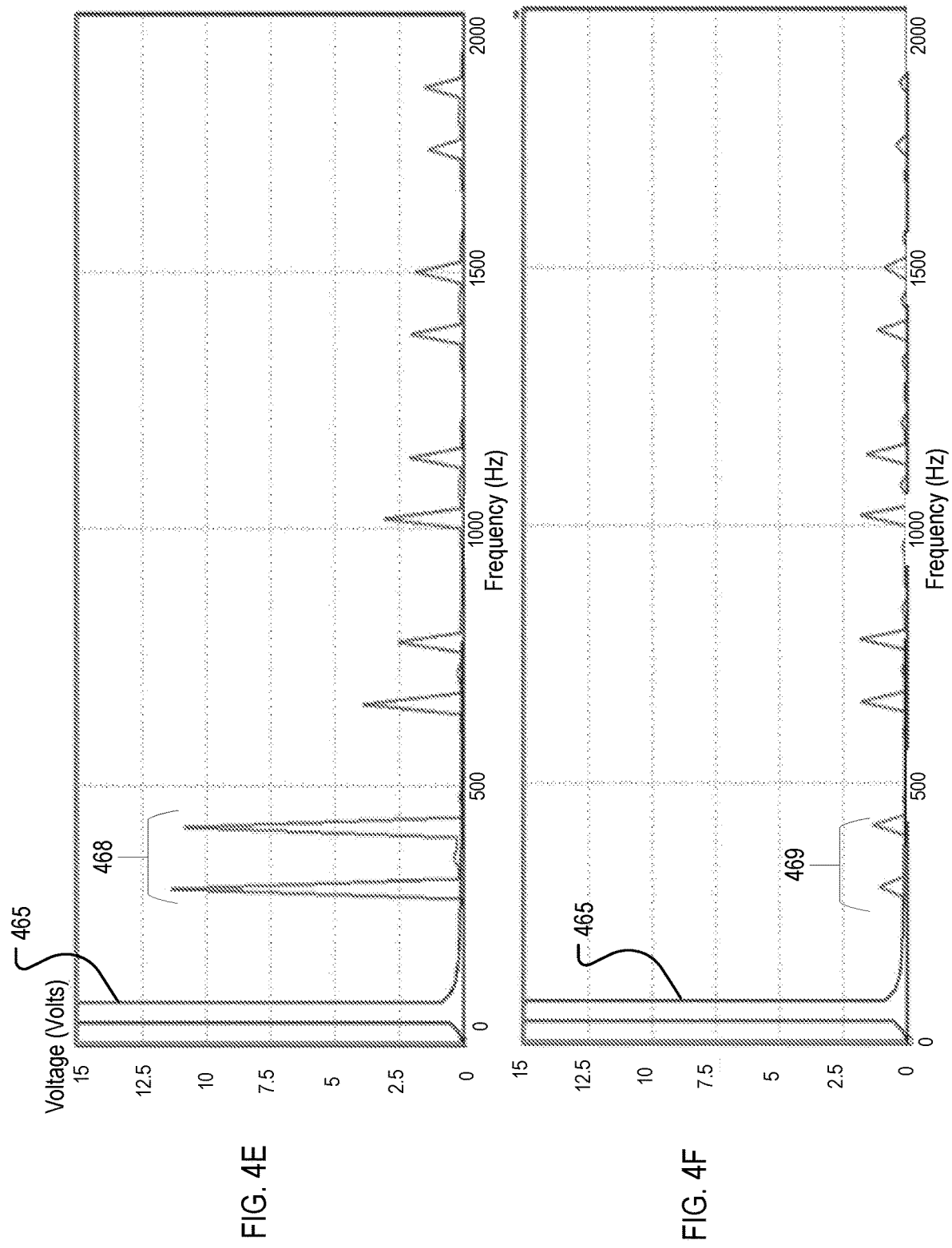

PROTECTION OF AN ELECTRICAL APPARATUS

CROSS-REFERENCE TO RELATED APPLICATION

This application claims the benefit of U.S. Provisional Application No. 62/857,611, filed on Jun. 5, 2019 and titled PROTECTION OF AN ELECTRICAL APPARATUS, which is incorporated herein by reference in its entirety.

TECHNICAL FIELD

This disclosure relates to protection of an electrical apparatus, such as a variable speed drive, an adjustable speed drive, or an uninterruptable power supply. The techniques may include, for example, a protection module formed from electronic components and/or a method of protecting the electrical apparatus.

BACKGROUND

An electrical apparatus, such as a variable speed drive, an adjustable speed drive, or an uninterruptable power supply, may be connected to an alternating current (AC) high-power electrical distribution system, such as a power grid. The electrical apparatus drives, powers, and/or controls a machine, or a non-machine type of load. The electrical apparatus includes an electrical network that converts AC power to direct-current (DC) power.

SUMMARY

In one aspect, an electrical apparatus configured to electrically connect to a multi-phase alternating current (AC) electrical power distribution network includes: an input electrical network including: a plurality of input nodes, each configured to electrically connect to one phase of the multi-phase AC electrical power distribution network; at least one non-linear electronic component electrically connected to the input electrical network; an impedance network electrically connected between the input electrical network and ground; and a control system configured to: access a voltage signal that represents a voltage over time at the input electrical network; determine a frequency content of the voltage signal; determine a property of the frequency content; and determine whether an input current performance condition exists in the electrical apparatus based the property of the frequency content.

Implementations may include one or more of the following features. In some implementations, if an input current performance condition exists in the electrical apparatus, the control system is further configured to reduce an amount of power provided to a load that is electrically connected to the electrical apparatus.

In some implementations, if an input current performance condition exists in the electrical apparatus, the control system is further configured to disconnect the electrical apparatus from the electrical power distribution network.

The determined frequency content may include one or more harmonic components of the voltage signal, and the property of the frequency content may include an amplitude of the one or more harmonic components of the voltage signal.

The determined frequency content may include one or more harmonic components of the voltage signal, and the property of the frequency content may be a sum of values that are each based on an amplitude of the one or more harmonic components of the voltage signal. The property of the frequency content may be a total harmonic distortion.

In some implementations, to determine whether an input current performance condition exists based on the property of the frequency content, the control system is configured to compare the property of the frequency content to a specification, and the input current performance condition exists if the property does not meet the specification. The control system may be configured to determine more than one property of the frequency content, the control system may be configured to compare all of the more than one properties of the frequency content to the specification, and the input current performance condition exists if at least one property does not meet the specification.

The impedance network may include a plurality of impedance assemblies, and one of the impedance assemblies may be electrically connected between ground and each of the plurality of input nodes, and the control system being configured to accessing a voltage signal may include the control system being configured to access a voltage signal at each of the plurality of input nodes and being configured to determine the frequency content of the voltage signal at each of the plurality of input nodes. The control system may be further configured to compare the voltage signal at each input node to the voltage signals at all of the other input nodes and to determine whether an unbalanced condition exists based on the comparison.

The electrical apparatus may be a variable speed drive (VFD) configured to control a torque and speed of an electric machine or an uninterruptable power supply (UPS) configured to power a non-machine load.

The at least one non-linear electrical component may be a plurality of diodes configured as a rectifier.

In another aspect, a method of protecting an electrical apparatus that is electrically connected to more than one phase of a multi-phase electrical power distribution network includes: accessing information related to an input voltage at each phase of the electrical apparatus; analyzing the information related to the input voltage at each phase to determine a frequency content of the input voltage at each phase; determining at least one property of the frequency content of the input voltage at each phase; determining whether an input current performance condition exists in the electrical apparatus based on the determined at least one property of the frequency content of the input voltage at each phase; and if an input current performance condition exists, reducing electrical power provided to a load coupled to the electrical apparatus or disconnecting the electrical apparatus from the power distribution network.

Implementations may include one or more of the following features. The method also may include comparing the information related to the input voltage at each phase to the information related to the input voltage of each of the other phases to determine whether an unbalanced condition exists.

Determining whether an input current performance condition exists may include comparing the determined at least one property for each phase to a threshold associated with that phase.

In another aspect, a multi-phase electrical apparatus, which is configured to electrically connect to a multi-phase AC electrical power distribution network and to provide a driver signal to a load, includes: an electrical network including: a plurality of input nodes, each input node configured to electrically connect to one phase of the multi-phase electrical power distribution network; and a converter configured to convert AC electrical power to direct-current (DC) electrical power, the converter including at least one non-linear electronic component; and an impedance network including a plurality of impedance assemblies. Each impedance assembly is electrically connected between one of the input nodes and ground.

Implementations may include one or more of the following features. The multi-phase electrical apparatus also may include a control system configured to: access a voltage signal at each input node, each voltage signal representing a voltage over time at one of the input nodes; determine a plurality of frequency representations, each frequency representation including a frequency content of one of the accessed voltage signals; and determine whether an input current performance condition exists in the electrical apparatus based on the frequency representations. The control system may be further configured to determine whether an unbalanced condition exists based on the accessed voltage signals. In some implementations, if an input current performance condition exists, the control system is further configured to reduce power to the load or to disconnect the load.

Implementations of any of the techniques described herein may include an apparatus, a device, a system, and/or a method. The details of one or more implementations are set forth in the accompanying drawings and the description below. Other features will be apparent from the description and drawings, and from the claims.

DRAWING DESCRIPTION

FIGS. 4E and 4F show the input voltage in one phase of an electrical apparatus as a function of frequency when the electrical apparatus is connected to, respectively, a "weak grid" and a "stiff grid."

DETAILED DESCRIPTION

Figure 1:
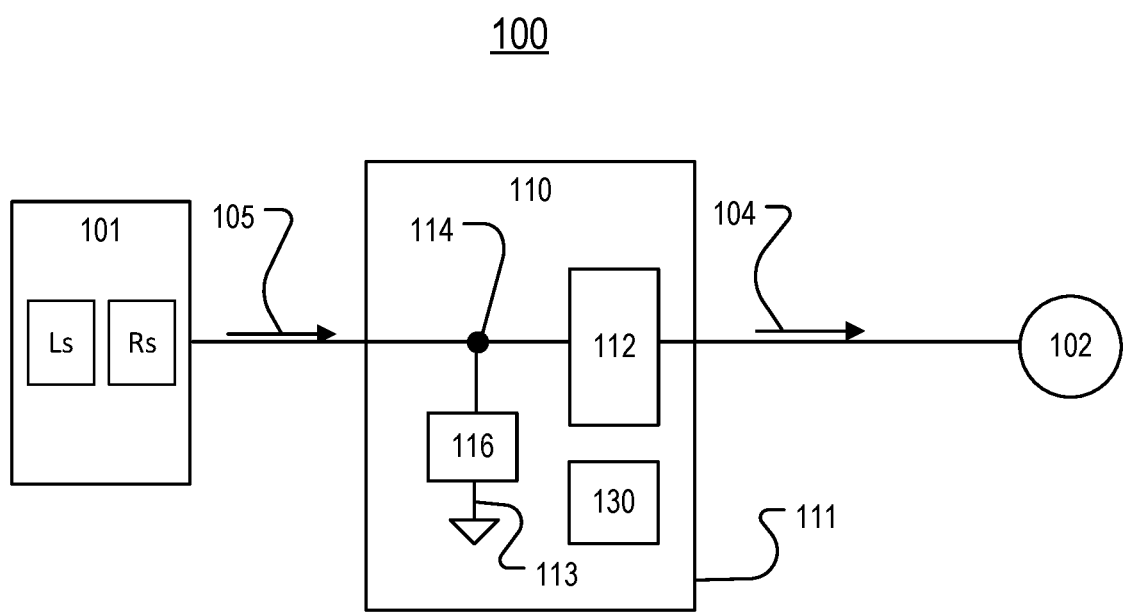
FIG. 1 is a block diagram of an example of a system that includes an electrical apparatus.

Referring to FIG. 1, a block diagram of a system 100 is shown. The system 100 includes an electrical apparatus 110 that is electrically connected to an alternating current (AC) electrical power distribution network 101 and a load 102. The load 102 may be a machine or a non-machine type of load. The electrical power distribution network 101 may be, for example, a multi-phase electrical power grid that provides electricity to industrial, commercial and/or residential customers. The AC electrical power distribution network 101 distributes AC electrical power that has a fundamental frequency of, for example, 50 or 60 Hertz (Hz). The distribution network 101 may have an operating voltage of, for example, up to 690V. The network 101 may include, for example, one or more transmission lines, distribution lines, power distribution or substation transformers, electrical cables, and/or any other mechanism for transmitting electricity.

The electrical apparatus 110 includes an electrical network 112 that receives electrical power 105 from the distribution network 101 at an input node 114. The electrical apparatus 110 is enclosed in a housing or enclosure 111. The housing 111 is a three-dimensional body made of a solid and rugged material that protects the electrical network 112. The input node 114 is accessible from an exterior of the housing 111 such that the electrical apparatus 110 may be connected to the distribution network 101. The electrical apparatus 110 also includes an output port (not shown) that is accessible from the exterior of the housing 111. The load 102 connects to the electrical apparatus 110 at the output port.

The electrical apparatus 110 also includes an impedance 116 that is electrically connected to the input node 114 and to ground 113. The ground 113 is shown as a floating artificial neutral point, but may be an earth ground. The voltage across the impedance 116 is the voltage at the input node 114. In other words, the voltage across the impedance 116 is the input voltage of the electrical apparatus 110. The voltage across the impedance 116 is monitored by a control system 130 and analyzed to determine if an input current performance condition (or performance condition) exists in the electrical apparatus 110. A performance condition is any condition or event that negatively impacts, or could negatively impact, the performance of the electrical apparatus 110. For example, a performance condition exists when the current flowing in the electrical network 112 has an amplitude that is capable of damaging or degrading the electrical components in the electrical network 112.

If a performance condition is determined to exist, the control system 130 takes corrective action. For example, if the current flowing in the electrical network 112 has a peak or root-mean-square (RMS) amplitude that could damage the components in the electrical network 112, the control system 120 decreases the amount of current flowing in the electrical network 112 or disconnects the electrical apparatus 110 from the distribution network 101.

The electrical network 112 includes one or more electronic components that are configured to generate a driver signal 104 for the load 102 based on electrical power 105 from the distribution network 101. For example, the electrical apparatus 110 may be a variable speed drive (VSD) or an adjustable speed drive (ASD) and the load 102 may be a machine-type load such as, for example, an induction machine, an induction motor, or a synchronous permanent magnet machine that operates at a speed and torque that is determined by the driver signal 104. In some implementations, the electrical apparatus 110 is an uninterruptable power supply (UPS) that provides electrical power to a non-machine type of load 102, such as a lighting system. The electrical network 112 includes one or more non-linear electrical components (such as diodes configured as a rectifier) that add harmonic components to the electricity that flows in the electrical network 112.

The maximum amount of current that may flow at the input node 114 under short circuit conditions is referred to as the short-circuit current ratio (SCCR) or the available fault current. The SCCR is determined by the operating voltage and the impedance of the distribution network 101. The SCCR may be, for example, 5 kilo-Amperes (kA) or 100 kA. The SCCR increases as the impedance of the distribution network 101 decreases. A power distribution network that has a relatively low impedance may be referred to as a "stiff grid" and a power distribution network that has a relatively high impedance may be referred to as a "weak grid." Thus, the SCCR of a "stiff grid" is greater than the SCCR of a "weak grid." The impedance of the distribution network 101 is represented by an inductance (Ls) in series with a resistance (Rs). For example, for a variable speed drive (VFD) rated as 60 horsepower (HP) (~45 kW), 480V, 3-phase input, 60 Hz, the "weak grid" input impedance at 5 kA SCCR has Ls=104 micro-henries (μH) and Rs=39 milli-ohms (m'Ω). The "stiff grid" input impedance at 100 kA SCCR has Ls=7.2 μH and Rs=543μ'Ω.

The SCCR may impact the performance of the electrical network 112 and, thus, may impact the performance of the electrical apparatus 110. For example, in implementations in which the distribution network 101 is a "stiff grid," the electrical network 112 may be exposed to excessive input electrical currents even when the load 102 is operating under normal load conditions. The exposure to high electrical currents may cause the components of the electrical network 112 to overheat, which may lead to the components malfunctioning, failing, or degrading. Some prior systems have included an additional impedance (such as a line reactor, input inductors, or a DC choke) in series with the impedance of the distribution network 101 to limit or prevent current spikes and current surges. However, such additional impedances increase overall costs, require additional space, generate heat, and waste electricity.

On the other hand, the electrical apparatus 110 includes the impedance 116 that is electrically connected to the input node 114 and to ground 113. Unlike the line impedance of the prior systems, current flowing into the electrical apparatus 110 does not flow in the impedance 116 and the impedance 116 is not part of the impedance of the distribution network 101. The impedance 116 allows the voltage at the input node 114 to be monitored easily and without interfering with the operation of the electrical apparatus 110. The impedance 116 may be made from, for example, simple and inexpensive components such as surface mount resistors.

The control system 130 uses properties of the monitored voltage to determine whether or not a performance condition exists in the electrical apparatus 110. For example, the control system 130 may analyze harmonics in the monitored voltage to determine whether or not excessive currents are flowing in the electrical network 112. If damaging or potentially damaging conditions exist, the control system 130 may remove the electrical apparatus 110 from service or reduce the stress on the electrical apparatus 110 by, for example, temporarily reducing the amount of current the electrical apparatus 110 provides to the load 102. The impedance 116 and the control system 130 protect the electrical apparatus 110 without relying on current sensors (which may be expensive and/or inconvenient to use) and without adding additional impedances into the path of the distribution network 101.

Figure 2A:
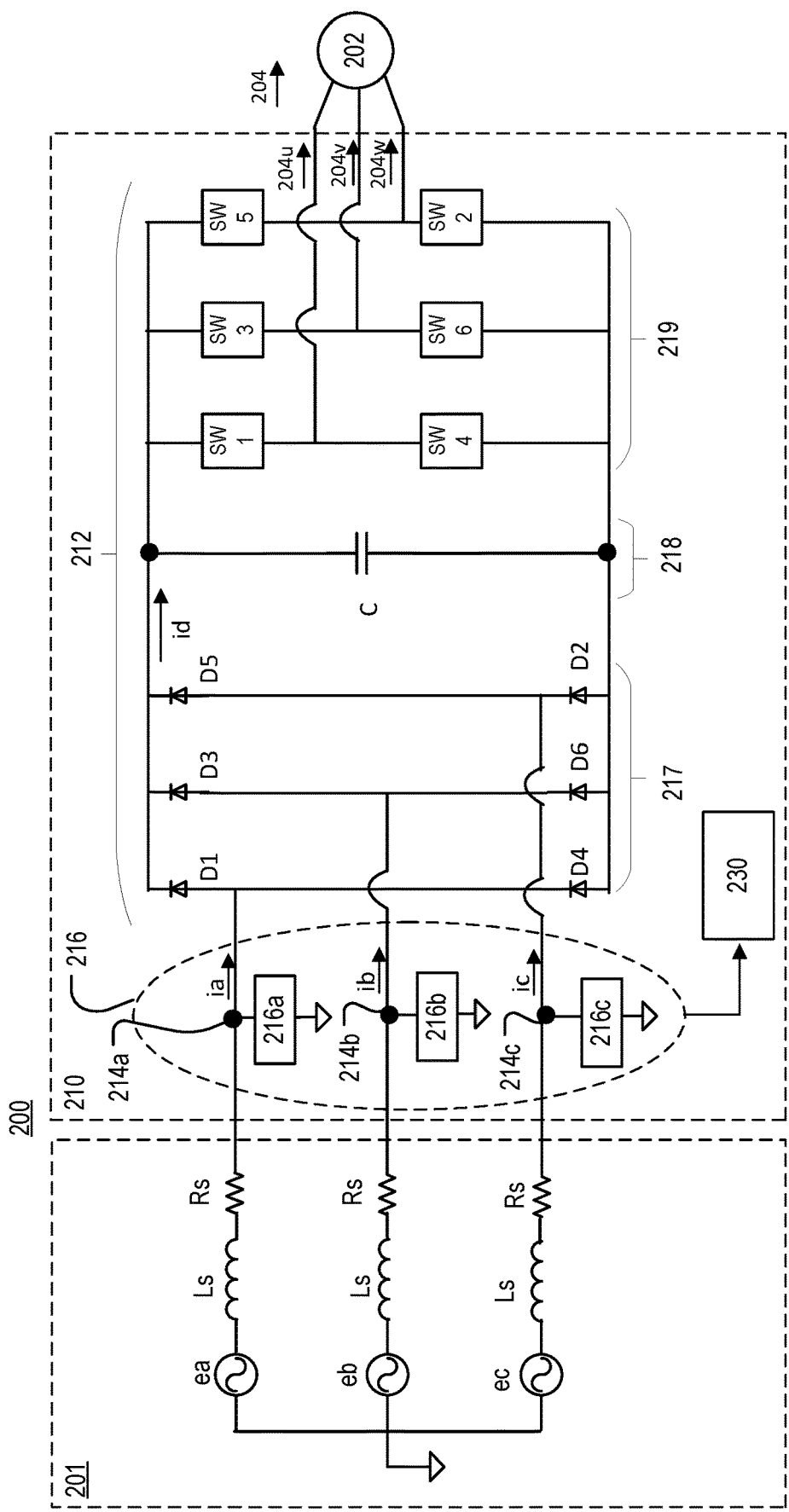
FIG. 2A is a block diagram of another example of a system that includes an electrical apparatus.

FIG. 2A is a schematic of a system 200. The system 200 includes an electrical apparatus 210 that is connected to a three-phase AC electrical power distribution network 201 and a load 202. The load 202 may be a machine or non-machine type load. For example, in some implementations, the electrical apparatus 210 is a VFD that controls a machine 202, such as, for example, an induction motor or a permanent magnet synchronous machine. In other implementations, the electrical apparatus 210 is a UPS that controls a non-machine type load, such as, for example, a lighting system.

The electrical apparatus 210 receives three-phase electrical power from the distribution network 201 and provides a three-phase driver signal 204 to the load 202. The electrical apparatus 210 includes a control system 230 that monitors a voltage at an impedance network 216 and uses the monitored voltage to assess whether or not a performance condition exists in the electrical apparatus 210. The dashed lines in FIG. 2A are used to show groupings of elements, and the dashed lines do not necessarily represent physical objects. However, the electrical apparatus 210 may include an enclosure similar to the housing 111 (FIG. 1). In implementations that include an enclosure, the impedance network 216 may be within the enclosure.

Figure 2B:
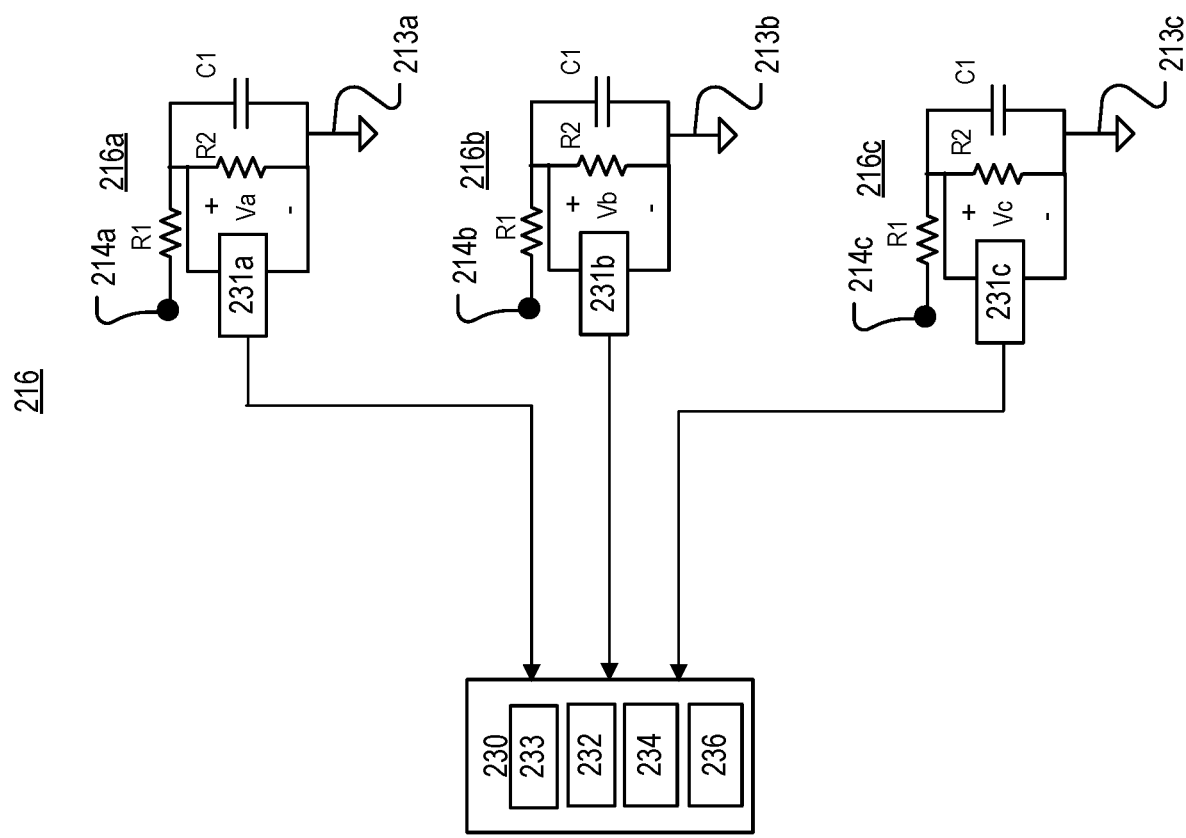
FIG. 2B is a block diagram of an example of a control system and an example of an impedance network that may be used in the system of FIG. 2A.
Figure 3A:
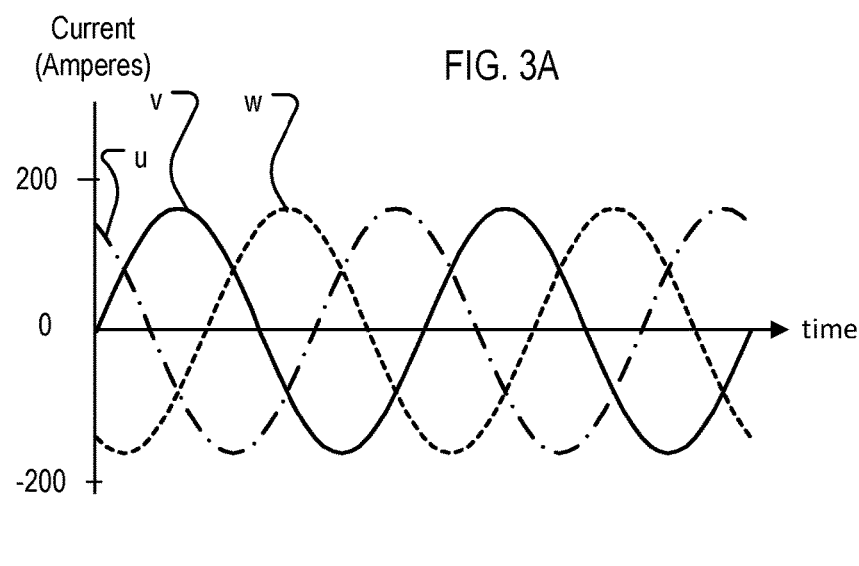
FIGS. 3A and 3B show examples of current drawn in each of three phases of a load connected to, respectively, a "weak grid" and a "stiff grid."
Figure 3B:
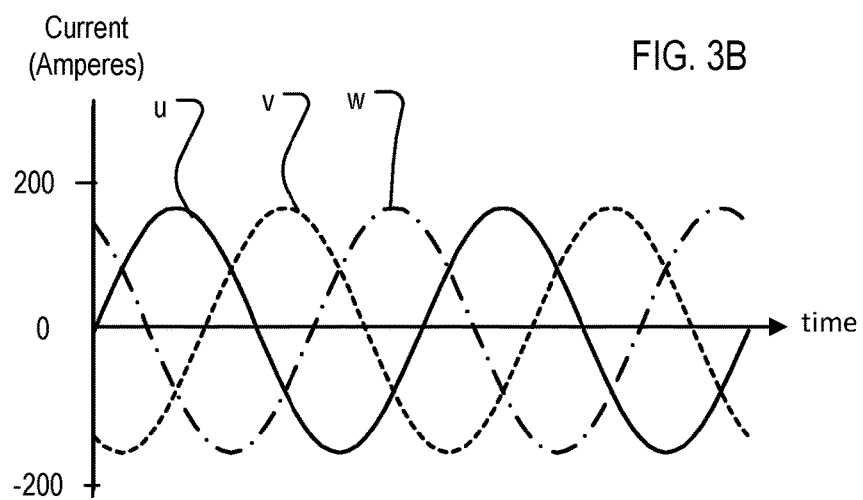

FIG. 2B is a block diagram of the control system 230 and the impedance network 216. FIGS. 3A and 3B show examples of current drawn by the same load for, respectively, a "weak grid" and a stiff grid." FIGS. 4A-4F show simulated data related to the input conditions of the electrical apparatus 210. FIGS. 2A, 3A, 3B, and 4A-4F are discussed prior to discussing FIG. 2B in more detail.

The electrical power distribution network 201 distributes AC electrical power that has a fundamental frequency of, for example, 50 or 60 Hertz (Hz). The distribution network 201 may have an operating voltage of up to 690V. The distribution network 201 may include, for example, one or more transmission lines, distribution lines, electrical cables, and/or any other mechanism for transmitting electricity. The distribution network 201 includes three phases, which are referred to as a, b, and c. Each phase has a respective voltage ea, eb, ec. The impedance of the distribution network 201 is represented by an inductor Ls in series with a resistance Rs. The impedance of the distribution network 201 depends on the impedance characteristics of the components included in the distribution network 201.

The electrical apparatus 210 includes input nodes 214a, 214b, 214c, each of which is electrically coupled to one of the three phases of the distribution network 201. In the example of FIG. 2A, the input node 214a is electrically connected to the a phase, the input node 214b is electrically connected to the b phase, and the input node 214c is electrically connected to the c phase. The electricity provided by the distribution network 201 is nominally sinusoidal and includes only a single frequency component at the fundamental frequency. The expected, theoretical, or nominal current provided by distribution network 201 is the same for the "weak grid" and the "stiff grid."

The electrical apparatus 210 includes an electrical network 212. The electrical network 212 includes a rectifier 217, a DC link 218, and an inverter 219. The rectifier 217 shown in FIG. 2A is a three-phase six-pulse bridge that includes six electronic switches. In the example of FIG. 2A, the six electronic switches are diodes D1-D6. Each diode D1-D6 includes a cathode and an anode and is associated with a forward bias voltage. Each diode D1-D6 allows current to flow in the forward direction (from the anode to the cathode) when voltage of the anode is greater than the voltage of the cathode by at least the bias voltage. When the voltage difference between the anode and the cathode is less than the forward bias voltage, the diode does not conduct current in the forward direction.

The input node 214a is electrically connected to the anode of the diode D1 and the cathode of the diode D4. The input node 214*b* is electrically connected to the anode of the diode D3 and the cathode of the diode D6. The input node 214*c* is electrically connected to the anode of the diode D5 and the cathode of the diode D2. The diodes D1-D6 rectify the input currents ia, ib, ic into a DC current id.

The diodes D1-D6 are also electrically connected to the DC link 218. The cathode of each diode D1, D3, D5 is electrically connected to the DC link 218, and the anode of each diode D2, D4, D6 is electrically connected to the DC link 218. The DC link 218 includes a capacitor network C. The rectified current id flows into the capacitor network C and is stored. The capacitor network C includes one or more capacitors that store electrical energy when the rectified current id flows from the rectifier 217 and discharge the stored electrical energy when the rectified current id does not flow from the rectifier 217.

The inverter 219 converts the DC power stored in the capacitor network C into three-phase AC driver signal 204 that is provided to the load 202. The three-phase driver signal 204 has phase components 204*u*, 204*v*, 204*w*, each of which is provided to one of the three-phases of the load 202. The inverter 219 includes a network of electronic switches SW1-SW6 that are arranged to generate the driver signal 204. Each of the switches SW1-SW6 may be, for example, a power transistor. Because the inverter 219 uses the electrical energy stored in the DC link 218, the driver signal 204 continues to be produced as expected and load 202 may function under normal and expected load conditions even if the magnitude of the current that flows in the rectifier 217 and into the DC link 218 increases to a level that may damage the components in the rectifier 217 and the DC link 218.

FIG. 3A shows an example the current drawn by each phase u, v, w of the load 202 as a function of time in an implementation in which the distribution network 201 is a "weak grid" with a SCCR of 5 kA and a fundamental frequency of 60 Hz. FIG. 3B is an example of current drawn by each phase u, v, w of the load 202 in an implementation in which the distribution network is a "stiff grid" with a SCCR of 100 kA and a fundamental frequency of 60 Hz. In FIGS. 3A and 3B, the u phase current is plotted with a solid line style, the v phase current is plotted with a dashed line style, and the w phase current is plotted with a dash-dot line style. In FIGS. 3A and 3B, the current drawn by each phase of the load 202 lags or leads the current in the other two phases by 120 degrees (°).

In both FIGS. 3A and 3B, the electrical apparatus 210 was a 60 HP (~45 kW), 480V, 3-phase input, 60 Hz VFD that includes an electrical network such as the electrical network 212 and the load 202 was a rated induction machine load of 250 Newton-meters (Nm). The currents drawn by the load 202 are the same for the "stiff grid" and the "weak grid," and the currents drawn by the load 202 are nearly sinusoidal. Even though the currents drawn by the load 202 are the same for the "stiff grid" and the "weak grid," the currents flowing at the input nodes 214*a*, 214*b*, 214*c* are not the same for the "stiff grid" and the "weak grid," as discussed below.

Figure 4A:
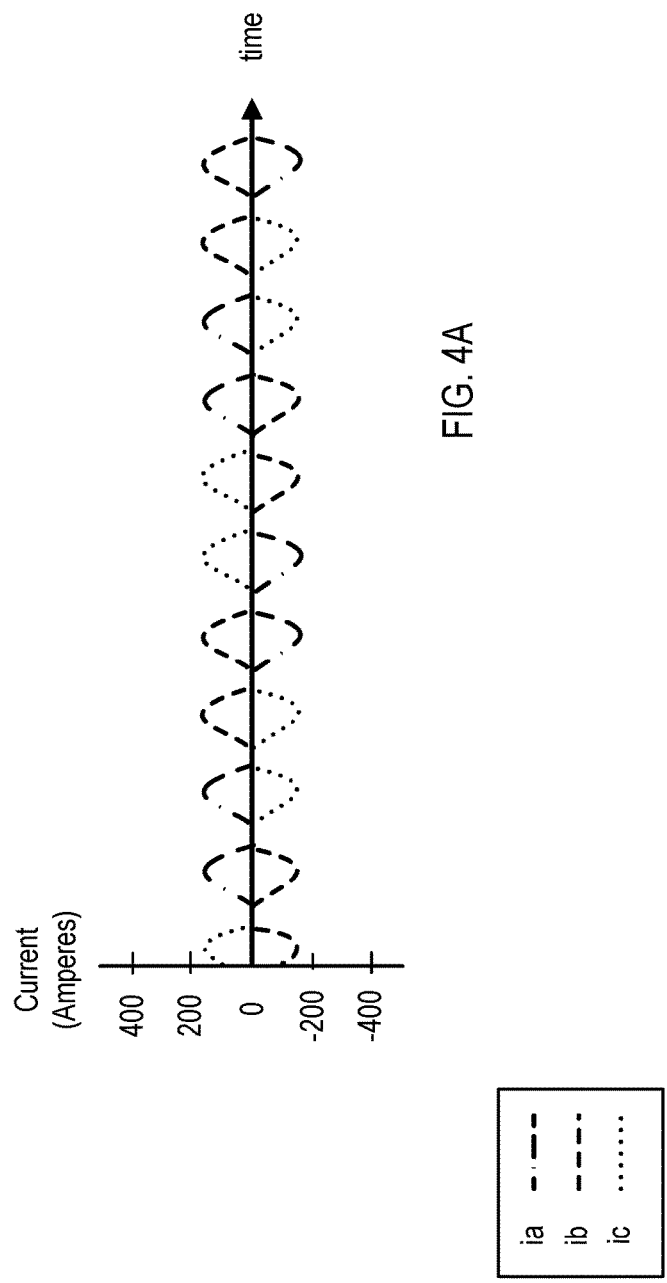
FIGS. 4A and 4B are plots of examples of simulated data that represent input currents in each of three phases of an electrical apparatus over time when the electrical apparatus is connected to, respectively, a "weak grid" and a "stiff grid."
Figure 4B:
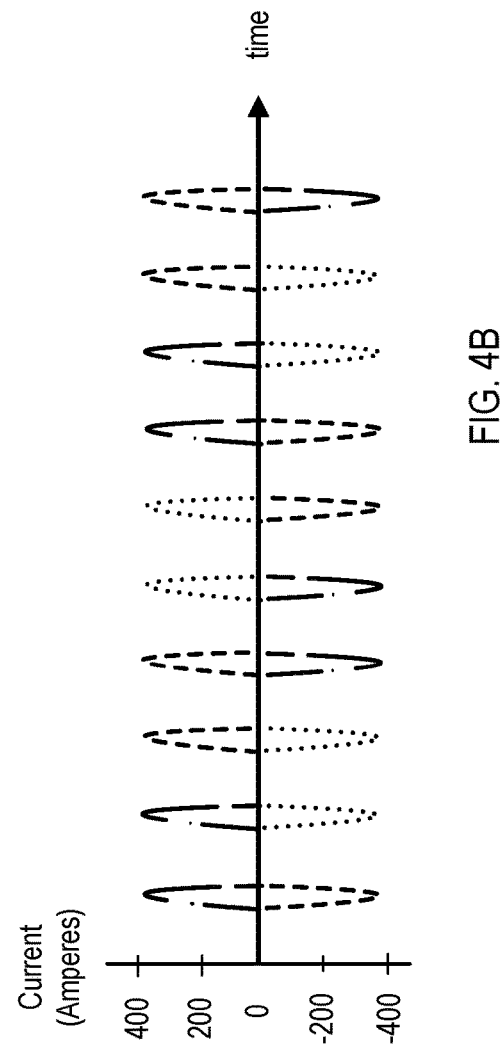
Figure 4C:
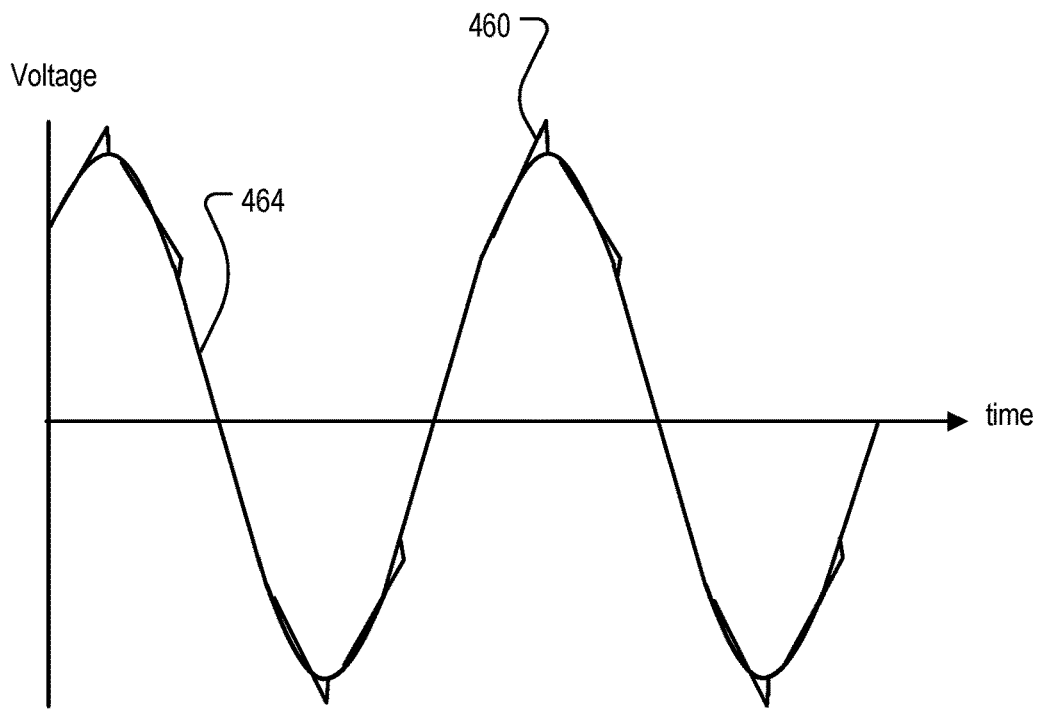
FIGS. 4C and 4D are plots of examples of simulated data that represent the input voltage at each of three phases of an electrical apparatus as a function of time when the electrical apparatus is connected to, respectively, a "weak grid" and a "stiff grid."
Figure 4D:
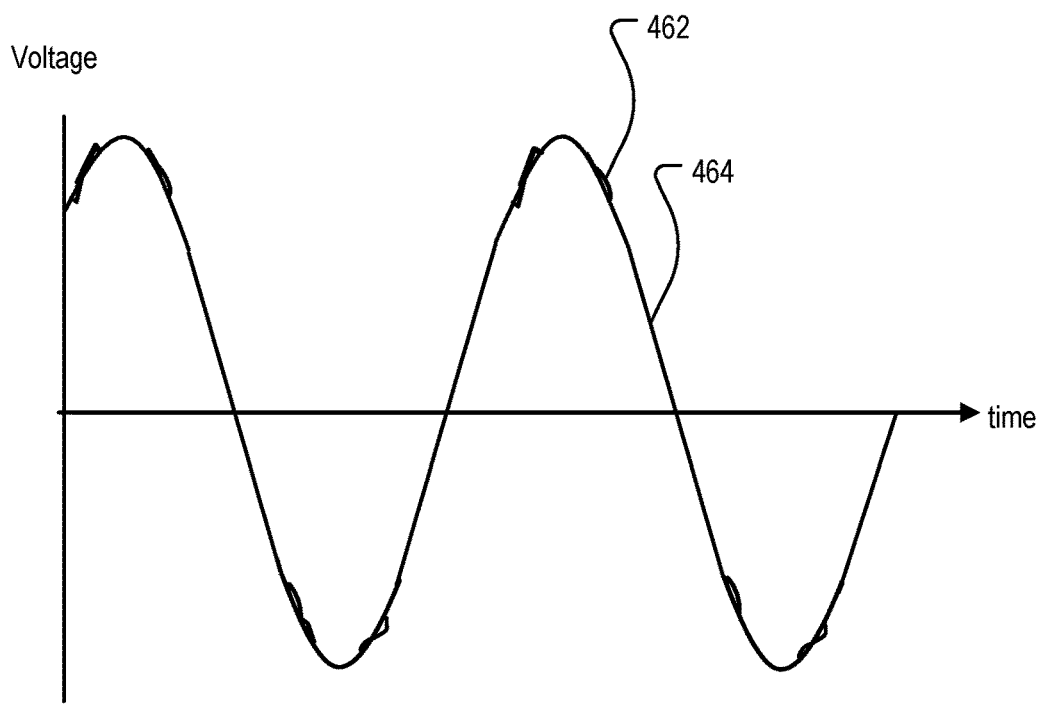

FIGS. 4A-4F are plots of example input current or voltage data produced by a simulation in which the fundamental frequency of the electrical distribution network 201 was 60 Hz. In the examples of FIGS. 4A-4F, the electrical apparatus 210 was a 60 HP (~45 kW), 480V, 3-phase input, 60 Hz VFD that includes an electrical network such as the electrical network 212. 4A and 4B are plots of simulated data that represent the input currents ia, ib, ic over time. FIGS. 4C and 4D are plots of simulated data that represent the input voltage at any of the input nodes 214*a*, 214*b*, 214*c* as a function of time. FIGS. 4E and 4F show the input voltage at any of the input nodes 214*a*, 214*b*, 214*c* as a function of frequency. The data shown in FIGS. 4A-4F is discussed below.

FIG. 4A shows the simulated input currents ia, ib, ic in an implementation in which the distribution network 201 has a SCCR of 5 kA. FIG. 4B show the simulated input currents ia, ib, ic in an implementation in which the distribution network 201 has a SCCR of 100 kA. In FIGS. 4A and 4B, ia is plotted with a dash-dot-dash-dash line style, ib is plotted with a dashed line style, and ic is plotted with a dotted line style. Each diode D1-D6 conducts electrical current when the voltage of the anode is greater than the voltage of the cathode by at least the forward bias voltage. Thus, the state of the diodes D1 and D4 depends on the voltage of the input node 214*a* and the voltage at the DC link 218. The state of the diodes D3 and D6 depends on the voltage at the input node 214*b* and the voltage at the DC link 218. The state of the diodes D5 and D2 depends on the voltage of the input node 214*c* and the voltage at the DC link 218. The input currents ia, ib, ic flow only when the input voltage is greater than the DC voltage at the DC link 218. As a result, the input currents ia, ib, ic vary in time as shown in FIGS. 4A and 4B.

As shown in FIGS. 4A and 4B, the magnitude of the input currents ia, ib, ic is greater in the 100 kA SCCR scenario (FIG. 4B) than in the 5 kA SCCR scenario (FIG. 4A). The data shown in FIGS. 4A and 4B is for a 60 HP (~45 kW), 480V, 3-phase input, 60 Hz VFD that includes an electrical network such as the electrical network 212. In the 5 kA SCCR scenario at the rated induction machine load of 250 Newton-meters (Nm), the peak input current in 210 was 168 A and the root mean square (RMS) current was 80 A. In the 100 kA scenario at the rated induction machine load of 250 Nm, the peak input current was 374 A and the RMS current was 121 A.

Thus, for the same load conditions, the peak input current and the RMS current that flows in the input nodes 214*a*, 214*b*, 214*c* is higher for the 100 kA (the "stiff grid") scenario than for the 5 kA scenario (the "weak grid"). As the SCCR increases, the magnitude of the current that flows in the rectifier 217 increases due to smaller voltage drops across smaller Ls and Rs. As a result, more electrical energy flows into and is stored by the capacitors C, and the voltage at the DC link 218 increases. The voltage ripple containing harmonics at the DC link 218 increases, which adds thermal stress to the DC link capacitors. The thermal stress degrades the DC link capacitors, shortening their lifetimes and decreasing their reliability. In addition, the much higher peak and RMS input currents ia, ib, ic for the 100 kA SCCR scenario (FIG. 4B) can exceed each semiconductor device peak current and RMS current ratings in the rectifier bridge 217, adding stress and causing failures. The input currents ia, ib, ic for the 100 kA SCCR scenario (FIG. 4B) also have shorter temporal durations than in the 5 kA SCCR scenario (FIG. 4A). This is because the time during which any of the diodes D1-D6 conduct current decreases because the voltage at the DC link 218 is greater. Higher currents flow in the input nodes 214*a*, 214*b*, 214*c* as the SCCR increases and the impedance (Ls and Rs) decreases, even though the current drawn by the load 202 stays the same (for example, as shown in FIGS. 3A and 3B). The higher currents have the potential to damage the electronic components in the rectifier 217 and the DC link 218.

FIGS. 4C and 4D show simulated input voltage as a function of time. FIG. 4C includes a plot 460 that shows simulated input voltage as a function of time for the scenario in which the electrical apparatus 210 is connected to a 5 kA SCCR distribution network 101. FIG. 4D includes a plot 462 that shows simulated input voltage as a function of time for the scenario in which the electrical apparatus 210 is connected to a 100 kA SCCR distribution network 201. The plots 460 and 462 may be the voltage as a function of time at any one of the input nodes 214a, 214b, 214c. In other words, each of the plots 460 and 462 show the input voltage of one phase as a function of time. FIGS. 4C and 4D also include a plot 464 that shows the nominal sinusoidal voltage of one phase of the distribution network 201 (ea, eb, or ec) without any distortion.

The plots 460 and 462 deviate from the nominal sinusoidal voltage 464 from the distribution network 201 because of the current peaks drawn by the electrical apparatus 210. The deviations from the nominal sinusoidal voltage is distortion. The current peaks and non-linear characteristics of the current drawn by the electrical apparatus 210 are shown in FIGS. 4A and 4B. Due to the current peaks and the discontinuous conduction, the input voltage at the electrical apparatus 210 (the voltage at any of the input nodes 214a, 214b, 214c) includes frequencies other than the fundamental frequency and the input voltage is not a pure sinusoidal waveform. The frequencies other than the fundamental frequency produce the distortion shown in FIGS. 4C and 4D. The distortion is greater in the 5 kA scenario (FIG. 4C) than the 100 kA scenario (FIG. 4D) because the values of Ls and Rs are larger in the 5 kA scenario.

The input voltage waveforms in FIGS. 4C and 4D represent one of the three phases. For balanced three phases (when the voltage is the same in each phase), the distortion levels are the same in each phase. But for unbalanced input voltages, the distortion levels and amplitudes can be different in each phase. The harmonic characteristics can be used for detecting the voltage unbalanced condition and protecting the system from premature failures.

FIG. 4E shows the simulated input voltage data plotted as 460 in FIG. 4C as a function of frequency. FIG. 4F shows the simulated input voltage data plotted as 462 in FIG. 4D as a function of frequency. The data shown in each of FIGS. 4E and 4F is a voltage spectrum that shows the spectral or frequency content of the input voltage of the electrical apparatus 210. The fundamental frequency component is labeled as the component 465. In addition to the fundamental frequency, the input voltages include higher-order frequency components or harmonics. In the scenario in which the electrical apparatus 210 is connected to a 5 kA SCCR network (FIG. 4E), the amplitude of the fifth and seventh harmonics are greater than 10 times larger than the amplitude of the fifth and seventh harmonics in the scenario in which the electrical apparatus 210 is connected to a 100 kA SCCR network (FIG. 4F). Thus, for the same load conditions, analysis of the amplitude of the voltage harmonics reveals whether the electrical apparatus 210 is connected to a "weak grid" or a "strong grid." The fifth and seventh harmonics are labeled as 468 in FIG. 4E and 469 in FIG. 4F.

Referring to FIG. 2B, the control system 230 and the impedance network 216 are shown. The control system 230 is an example of an implementation of the control system 130 of FIG. 1. The control system 230 analyzes voltages in the impedance network 216 to determine whether or not a performance condition exists in the electrical apparatus 210. A performance condition exists, for example, when the currents ia, ib, ic are damaging or potentially damaging to the components in the rectifier 217 and/or DC link 218.

The impedance network 216 includes an impedance apparatus for each phase of the distribution network 101 that is electrically connected to the electrical apparatus 210. Thus, in the example of FIG. 2B, the impedance network 216 includes three impedance apparatuses or protection modules 216a, 216b, 216c. The impedance apparatuses 216a, 216b, 216c are connected between respective input nodes 214a, 214b, 214c and respective grounds 213a, 213b, 213c. The voltages labeled Va, Vb, Vc (FIG. 2B) are the input voltages at the respective input nodes 214a, 214b, 214c. The grounds 213a, 213b, 213c are shown as floating artificial neutral points and are not necessarily the same point. In some implementations, the grounds 213a, 213b, 213c are connected to earth ground.

Each impedance apparatus 216a, 216b, 216c includes a respective voltage sensor 231a, 231b, 231c. The voltage sensors 231a, 231b, 231c may be, for example, potentiometers. Each of the impedances 216a-216c also includes a capacitor C1 and a voltage divider formed by resistors R1 and R2. The capacitor C1 is in parallel with the resistor R2. The voltage sensors 231a, 231b, 231c measure the voltage across the resistor R2 in each of the impedance apparatus 216a, 216b, 216c, respectively, and provide data representing the measured voltage to the control system 230. The resistors R1 and R2 and the capacitor C1 may be, for example, surface mount components that are suitable for mounting on a printed circuit board (PCB).

In the example shown in FIG. 2B, each impedance apparatus 216a, 216b, 216c includes the resistors for R1 and R2 in the same configuration. However, in other implementations, each impedance apparatus 216a, 216b, 216c may have a different configuration and may include different components. Moreover, any of the impedance apparatus 216a, 216b, 216c may have a different configuration than the configurations shown in FIG. 2B. The impedance apparatus 216a, 216b, 216c may be implemented in any sort of topology with any electronic components that form a known impedance such that data from the voltage sensors 231a, 231b, 231c may be used to determine the voltages at the respective input nodes 214a, 214b, 214c, The control system 230 includes an electronic processing module 232, a signal processing module 233, an electronic storage 234, and an input/output (I/O) interface 236. The electronic processing module 232 includes one or more electronic processors. The electronic processors of the module 232 may be any type of electronic processor and may or may not include a general purpose central processing unit (CPU), a graphics processing unit (GPU), a microcontroller, a field-programmable gate array (FPGA), Complex Programmable Logic Device (CPLD), and/or an application-specific integrated circuit (ASIC).

The signal processing module 233 is configured to transform data produced by the sensors 231a, 231b, 231c and/or data based on data produced by the sensors 231, 231b, 231c between a time domain and a frequency domain. The signal processing module 233 may be implemented in hardware or software, or in a combination of hardware and software. For example, the signal processing module 233 may be a collection of instructions that are stored on the electronic storage 234 that collectively form a function or subroutine that the electronic processing module 232 may execute to perform a fast Fourier transform (FFT). In other implementations, the signal processing module 233 is implemented with a collection of electronic components that form, for example, a phase-locked loop or other configuration that is capable of extracting certain frequencies from an input signal.

The electronic storage 234 may be any type of electronic memory that is capable of storing data and instructions in the form of computer programs or software, and the electronic storage 234 may include volatile and/or non-volatile components. The electronic storage 234 and the processing module 232 are coupled such that the processing module 232 is able to access or read data from and write data to the electronic storage 234. The electronic storage 234 stores instructions that, when executed, cause the electronic processing module 232 to analyze data and/or retrieve information. The electronic storage 234 also may store information about the system 200. For example, the electronic storage 234 may store information about the impedance network 216 for use in, for example, analyzing data from the sensors 231a, 231b, 231c. The stored information about the impedance network 216 may include values of the resistors R1 and R2.

The I/O interface 236 may be any interface that allows a human operator and/or an autonomous process to interact with the control system 230. The I/O interface 236 may include, for example, a display (such as a liquid crystal display (LCD)), a keyboard, audio input and/or output (such as speakers and/or a microphone), visual output (such as lights, light emitting diodes (LED)) that are in addition to or instead of the display, serial or parallel port, a Universal Serial Bus (USB) connection, and/or any type of network interface, such as, for example, Ethernet. The I/O interface 236 also may allow communication without physical contact through, for example, an IEEE 802.11, Bluetooth, or a near-field communication (NFC) connection. The control system 230 may be, for example, operated, configured, modified, or updated through the I/O interface 236.

The I/O interface 236 also may allow the control system 230 to communicate with components in the system 200 and with systems external to and remote from the system 200. For example, the I/O interface 236 may control a switch or a switching network (not shown) or a breaker within the system 200 that allows the electrical apparatus 210 to be disconnected from the distribution network 210. In another example, the I/O interface 236 may include a communications interface that allows communication between the control system 230 and a remote station (not shown), or between the control system 230 and a separate monitoring apparatus. The remote station or the monitoring apparatus may be any type of station through which an operator is able to communicate with the control system 230 without making physical contact with the control system 230. For example, the remote station may be a computer-based work station, a smart phone, tablet, or a laptop computer that connects to the motor control system 230 via a services protocol, or a remote control that connects to the control system 230 via a radio-frequency signal.

Figure 5:
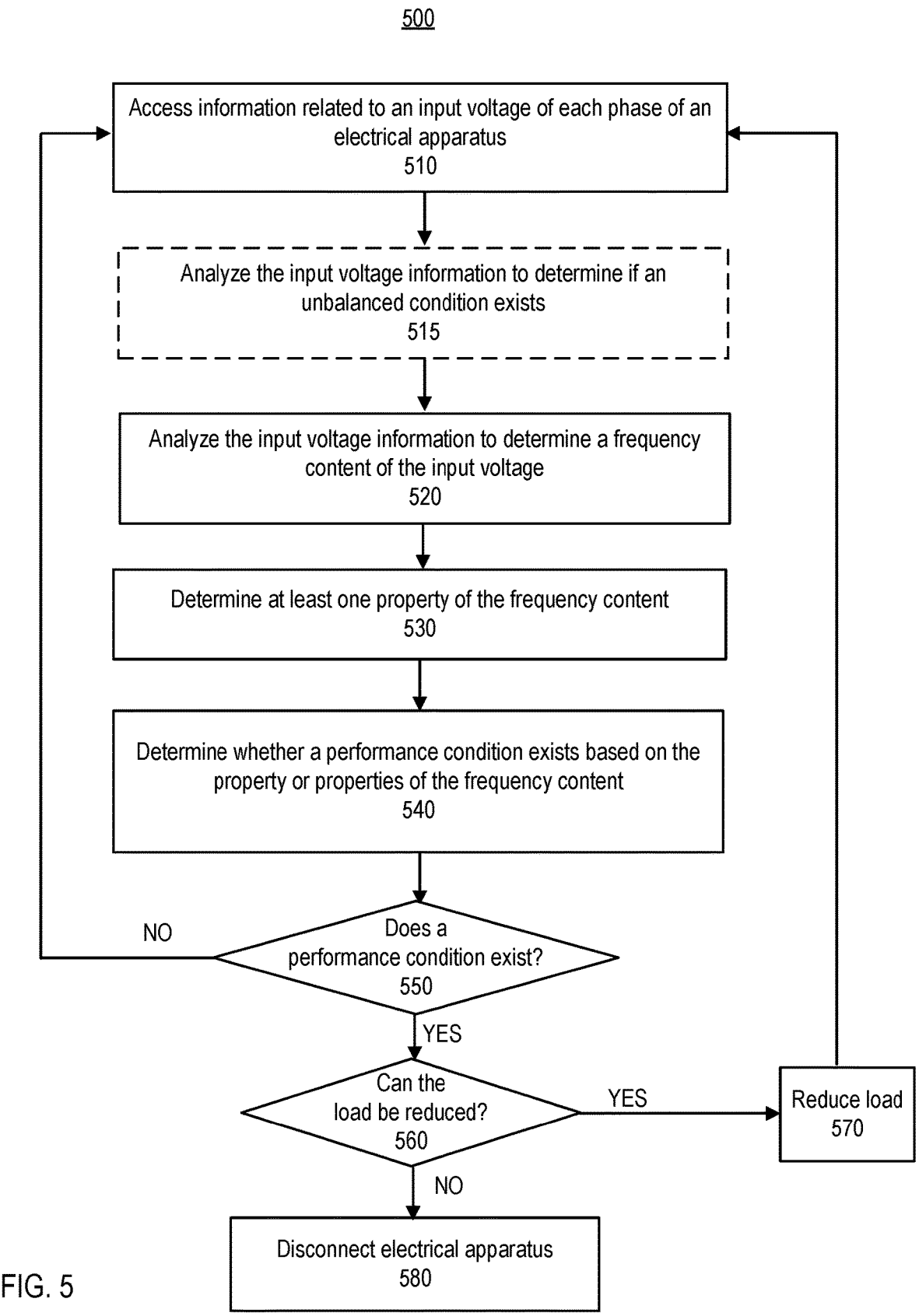
FIG. 5 is a flow chart of an example process for protecting an electrical apparatus.

Referring to FIG. 5, a flow chart of a process 500 is shown. The process 500 is an example of a process for protecting an electrical apparatus, such as, for example, a VFD or a UPS. The process 500 may be performed by the signal processing module 233 and/or one or more electronic processors in the electronic processing module 232 (FIG. 2B). The process 500 is discussed with respect to the system 200 of FIG. 2. However, the process 500 may be performed with other systems. For example, the process 500 may be performed with the system 100 of FIG. 1.

Information related to an input voltage at each phase of the electrical apparatus 210 is accessed (510). For example, each of the voltage sensors 231a, 231b, 231c measures the voltage across the resistor R2 of the respective impedance apparatus 216a, 216b, 216c. The voltage across each resistor R2 is information related to the voltage at the respective input node 214a, 214b, 214c according to Equation 1:

$$V_{R2} = V_i \left( \frac{R2}{R1 + R2} \right), \quad \text{Equation (1)}$$

where $V_{R2}$ is the voltage across the resistor R2 as measured by one of the sensors 231a, 231b, 231c and $V_i$ is the voltage at the respective input node 214a, 214b. 214c. The information may be accessed by the control system 230 receiving data that represents the voltage measured by each sensor 231a, 231b, 231c. For example, the voltage sensors 231a, 231b, 231c may provide information related to the measured voltage to the control system 230. In another example, the control system 230 may retrieve the measured voltage from the sensors 231a, 231b, 231c.

The temporal characteristics of the input voltage at the input nodes 214a, 214b, 214c are determined from voltage measurements obtained from the voltage sensors 231a, 231b, 231c. For example, measurements from each of the voltage sensors 231a, 231b, 231c obtained at different times are stored on the electronic storage 234. The electronic storage 234 also may store a collection of instructions, for example, a computer program, that determines the voltage at each input node 214a, 214b, 214c over time based on the measured voltage data, stored values for R1 and R2, and Equation 1. The voltage at each input node 214a, 214b, 214c as a function of time is referred to, respectively, as Vta, Vtb, Vtc. As discussed above, the plots 460 (FIG. 4C) and 462 (FIG. 4D) show examples of a voltage at one of the input nodes 214a, 214b, 214c as a function of time. One of the voltages Vta, Vtb, Vtc may be similar to the voltages shown in the plot 460 (FIG. 4C) or the plot 462 (FIG. 4D). Each of the voltages Vta, Vtb, Vtc are separated by 120° in phase. In a balanced voltage scenario (discussed below with respect to (515)), each of the voltages Vta, Vtb, Vtc has the same or substantially the same distortion. In an unbalanced voltage scenario, each of the voltages Vta, Vtb, Vtc has a different distortion.

Figure 6:
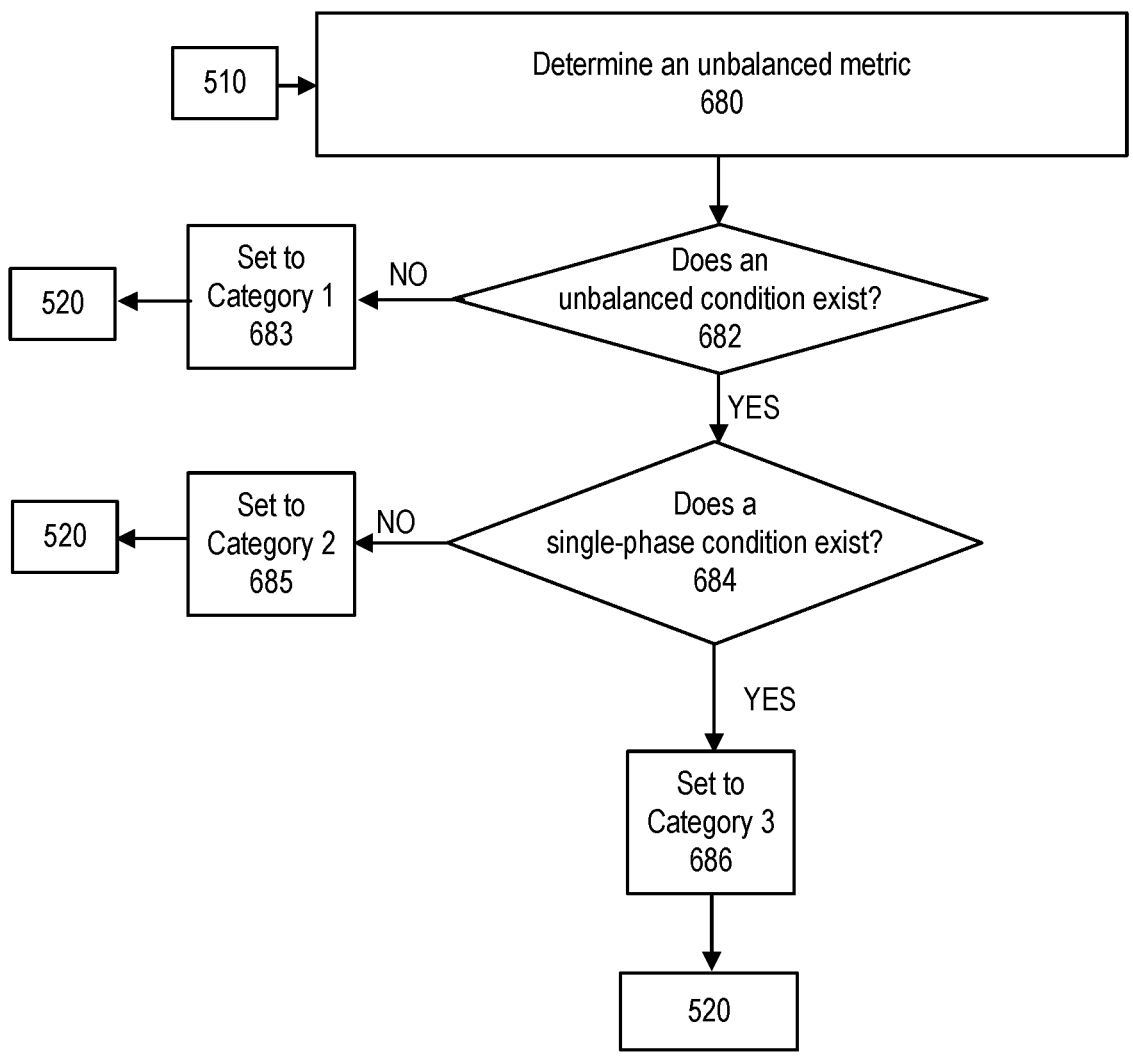
FIG. 6 is a flow chart of an example process for determining whether an unbalance condition exists.

In some implementations, the process 500 analyzes the input voltage information to determine whether an unbalanced condition exists (515). FIG. 6 is a flow chart of the process 515 that may be used to determine whether an unbalanced condition exists. The process 515 determines whether the electrical apparatus 210 is balanced or unbalanced. If the electrical apparatus 210 is balanced, then the electrical apparatus 210 is operating in Category 1. If the electrical apparatus 210 is unbalanced, and is operating in Category 2 or 3, as discussed below. In some implementations, the process 515 is not performed and the process 500 continues to (520). In these implementations, the electrical apparatus 210 is assumed to be in Category 1.

Referring to FIG. 6, an unbalanced metric is determined (680). The unbalanced metric is based on the input voltage as a function of time at each of the input nodes 214a, 214b, 214c (respectively Vta, Vtb, Vtc). As discussed above, the input voltage as a function of time at each input node 214a, 214b, 214c is obtained at (510). When the input voltage is balanced, the voltage over time at each input node 214a, 214b, 214c (respectively, Vta, Vtb, Vtc) is the same, although the phases are separated from each other by 120°. When the input voltage is unbalanced, the voltage over time at each input node 214a, 214b, 214c (respectively, Vta, Vtb, Vtc) is not the same. In other words, when the input voltage is balanced, the RMS voltage is the same at each input node 214a, 214b, 214c. When the input voltage is unbalanced, the RMS voltage is not the same at each input node 214a, 214b, 214c. The unbalanced metric is any quantity that characterizes the discrepancy among the input voltages as a function of time at the input nodes 214a, 214b, 214c. The unbalance metric may be, for example, an unbalance percentage. The unbalance percentage for a three-phase system such as the electrical apparatus 210 is determined, for example, using Equations (2) and (3):

$$\text{Unbalance percentage} = \frac{|V_{avg} - V_\varphi|}{V_{avg}} \qquad \text{Equation (2)}$$

$$V_{avg} = \frac{V_{ar} + V_{br} + V_{cr}}{3}, \qquad \text{Equation (3)}$$

where Var, Vbr, Vcr are the RMS amplitudes of the voltages as a function of time at the input nodes 214a, 214b, 214c, respectively; Vavg is the average of the RMS amplitude of the voltages as a function of time at the input nodes 214a, 214b, and 214c; and V$\varphi$ is the amplitude of the one of the three input phase RMS voltages Var, Vbr, Vcr that produces the largest deviation from the average RMS voltage Vavg. When the voltages as a function of time at the input nodes 214a, 214b, 214c are balanced, the unbalance percentage given by Equations (2) and (3) is zero (0). The unbalance percentage increases as the unbalance becomes more severe.

Whether or not an unbalanced condition exists is determined based on the unbalance metric (682). For example, the unbalance metric determined in (680) is compared to a first unbalanced threshold value that is stored on the electronic storage 234. If the unbalance metric is less than the first unbalanced threshold, the input voltages at the input nodes 214a, 214b, 214c are balanced and an unbalanced condition does not exist. This is referred to as a Category 1 scenario. A flag or variable that indicates that the input voltages are balanced and that a Category 1 scenario exists is set (683) and is stored in the electronic storage 234 and/or returned to the process 500. The process 515 ends and the process 500 continues to (520).

On the other hand, if the unbalance metric is greater than the first unbalanced threshold, then an unbalanced condition exists, and the input voltages at the input nodes 214a, 214b, 214c are considered to be unbalanced. If an unbalanced condition exists, then the severity of the unbalance is assessed by determining whether a single-phase condition exists (684).

The unbalanced input voltage may lead to damage and/or a shortening of the lifetime of the capacitor network C in the DC link 218. For example, a relatively small amount of voltage unbalance may lead to one of the input nodes 214a, 214b, 214c conducting much more current than the other input nodes. For example, a much higher current may flow in one of the input nodes 214a, 214b, 214c than the other nodes during an unbalanced condition. The high amount of current may damage the electrical components in the rectifier 217 and/or the voltage and current harmonics on the DC link may damage the capacitors in the capacitor network C.

If the unbalanced condition is severe, the electrical apparatus 210 may enter single-phase operation. In single-phase operation, only two of the input nodes 214a, 214b, 214c are connected to the power distribution network 201. Two of the three input nodes conduct all of the input current for the electrical apparatus 210, and this leads to even greater damage of the electrical components in the network 212. Whether or not the electrical apparatus 210 has entered single-phase operation is determined (684). To determine whether the electrical apparatus 210 is in single-phase operation, the unbalance metric is compared to a second unbalance threshold. The second unbalance threshold is greater than the first unbalance threshold. Thus, the second unbalance threshold is used to detect a more severe unbalance condition that is negatively affecting the performance of electrical apparatus 210.

If the electrical apparatus 210 is not in single-phase operation, a single-phase condition does not exist (but an unbalance condition exists based on (682)), and a Category 2 scenario exists. A flag or variable that indicates that the input voltages are unbalanced and that a Category 2 scenario exists is set (685) and is stored in the electronic storage 234 and/or returned to the process 500. The process 520 ends.

If the electrical apparatus 210 is in single-phase operation, a Category 3 scenario exists. A flag or variable that indicates that the input voltages are severely unbalanced and that a Category 3 scenario exists is set (686) and is stored in the electronic storage 234 and/or returned to the process 500. The process 515 ends.

Referring again to FIG. 5, the process 500 continues at (520). At (520), the input voltage information obtained at (510) is analyzed to determine frequency content of the input voltage. The input currents ia, ib, ic include components at the fundamental frequency of the distribution network 201 and components at harmonics of the fundamental frequency. Thus, the input voltage at each of the input nodes 214a, 214b, 214c as a function of time (Vta, Vtb, Vtc, respectively) also include components at the fundamental frequency and components at harmonics of the fundamental frequency. A harmonic is a component that has a frequency that is an integer multiple of the fundamental frequency. The frequency component at the fundamental frequency is also referred to as the first harmonic. Other harmonics have higher frequencies that are determined by the multiple associated with that harmonic. For example, in implementations in which the distribution network 201 has a fundamental frequency of 60 Hz, the third harmonic is at 180 Hz, and the fifth harmonic is at 300 Hz.

In some implementations, the frequency content of Vta, Vtb, Vtc is determined with a signal processing technique. For example, the electronic storage 234 stores instructions that transform the voltages Vta, Vtb, Vtc (which are a function of time) into voltages that are a function of frequency. The voltages Vta, Vtb, Vtc may be transformed into three separate signals Vfa, Vfb, Vfc, each of which are in frequency domain by, for example, applying the Fourier transform to each voltage signal Vta, Vtb, Vtc. Each signal Vfa, Vfb, Vfc provides the amplitude of the voltage as a function of frequency. The voltage spectrums shown in FIGS. 4E and 4F are examples of information that may be included in each of the signals Vfa, Vfb, Vfc. The voltage spectrums shown in FIGS. 4E and 4F are provided only as examples. The specific characteristics of the signals Vfa, Vfb, Vfc depend on the characteristics of the distortion in the respective phase a, b, c.

In some implementations, the frequency content of the input voltage information is determined by extracting the fundamental component and one or more other harmonics. The fundamental harmonic and another harmonic component h may be extracted using the following example relationships with h=3:

$$\frac{1}{2\pi}\int_0^{2\pi}(I_1\cos\theta + I_3\cos3\theta)\cos3\theta\,d\theta = \frac{I_3}{2} \qquad \text{Equation (4)}$$

$$\frac{1}{2\pi}\int_0^{2\pi}(I_1\cos\theta + I_3\cos3\theta)\sin3\theta d\theta = 0,$$

where $I_1$ is the amplitude of the fundamental component, $I_3$ is the amplitude of the $3^{rd}$ harmonic component, $\theta=\omega t$, $\omega=2\pi f$, and f is the fundamental frequency. In these implementations, instructions that implement Equation 4 are stored on the electronic storage 234 and are executed by the electronic processing module 232.

The examples above relate to the control system 230 using software stored on the electronic storage 234 to transform the input voltage signals Vta, Vtb, Vtc into the frequency domain input voltage signals Vfa, Vfb, Vfc. However, other approaches are possible. For example, the control system 230 may implement the signal processing module 231 as a phase-locked loop as part of digital or analog electronic network that extracts particular frequencies from voltage signals measured by the sensors 231a, 231b, 231c.

At least one property of the frequency content is determined (530). The property of the frequency content may be, for example, an amplitude of one of more of the harmonics in each of the frequency domain voltage signals Vfa, Vfb, Vfc. For example, the amplitude of the fifth, seventh, eleventh, and thirteenth harmonics may be determined. The amplitudes may be determined using the example formulation shown in Equation (4) or by applying a transformation such as the Fourier transform to time-domain voltage data and then identifying the amplitude at the frequencies associated with the harmonic or harmonics of interest.

In some implementations, the property of the frequency content is a total harmonic distortion (THD). The THD is the ratio of square root of the sum of the powers of all harmonic components to the power of the fundamental frequency. The THD may be determined using:

$$THD = \frac{\sqrt{V_2^2 + V_3^2 + V_4^2...}}{V_1}, \quad \text{Equation (5)}$$

where Vn is the amplitude of the nth harmonic and n=1 is the fundamental frequency.

In some implementations, the one or more frequency-based properties are determined for the frequency content of each phase of the input voltage. In these implementations, one or more properties of each the frequency domain voltage signals Vfa, Vfb, and Vfc are determined. For example, a THD may be determined for each phase and/or an amplitude of one or more harmonics may be determined for each phase. In another example, the amplitude of each of a plurality of harmonics is determined in each phase.

In other implementations, the frequency-based properties are determined for fewer than all of the phases. For example, if a balanced condition exists (Category 1) as determined by (515), the frequency content is the same for all of the phases. In some implementations, if a balanced condition exists, the frequency-based properties may be determined for fewer than all of the phases.

Whether or not a performance condition exists is determined based on the one or more properties of the frequency content (540). A performance condition is a condition that is or could negatively impact the performance of the electrical apparatus 210. Excessive currents flowing in the rectifier 217 and/or the DC link 218 are an example of a performance condition. Excessive currents may flow in the rectifier 217 and/or the DC link 218 even when the load 202 is operating under normal conditions. For example, when the electrical apparatus 210 is connected to a "stiff grid," excessive and damaging or potentially damaging currents may flow in the rectifier 217 and/or the DC link 218 even when the load 202 is operating under normal conditions. Thus, by analyzing the frequency content of the input voltages at input nodes 214a, 214b, 214c, the control system 230 is able to detect the presence of damaging or potentially damaging currents even when the load 202 is operating under normal conditions. Moreover, the control system 230 is able to detect the presence of damaging or potentially currents in the rectifier 217 and/or DC link 218 that may arise when an unbalanced voltage condition exists.

To determine whether a performance condition exists, in some implementations, the property or properties of the frequency content determined in (530) are compared to a specification. The specification includes one or more values that are associated with performance conditions of the electrical apparatus 210. For example, the specification may include a range of amplitude values for the fifth harmonic of an input voltage frequency signal that are correlated with satisfactory or safe operation of the rectifier 217 and the DC link 218. In this example, an amplitude of the fifth harmonic is determined from measured data (the frequency domain input voltage signals Vfa, Vfb, Vfc) and compared to the specification. If the determined amplitude is within the specification, then a performance condition does not exist based on that criteria (the amplitude of the $5^{th}$ harmonic in this example). If the determined amplitude is outside of the specification, then a performance condition exists based on that criteria. The specification may include one or more values or criteria that are specific to each Category 1, 2, 3.

To provide a more specific example, the electrical apparatus 210 may be in Category 1 (a balanced condition). In this example, the specification indicates that, if the amplitude of the $5^{th}$ harmonic in the input voltage frequency spectrum is greater than or equal to 5 V, then a performance condition does not exist. If the determined amplitude of the $5^{th}$ harmonic is less than 5 V, then a performance condition exists. Because the input voltages are known to be balanced in this example, in some implementations, the amplitude of the $5^{th}$ harmonic of only one of the phases (Vfa, Vfb, or Vfc) is compared to the threshold to determine whether a performance condition exists. In some implementations, the amplitude of the $5^{th}$ harmonic in all phases (Vfa, Vfb, and Vfc) are compared to the 5V threshold even though the amplitude of the $5^{th}$ harmonic should be the same in each phase in a Category 1 or balanced scenario.

The specification may include different thresholds for Category 1, 2, and 3 as discussed by way of the following examples. The Category in which the electrical apparatus 210 operates may be determined in (515) as discussed above. In implementations in which (515) is not performed and the unbalanced metric is not determined, the electrical apparatus 210 is assumed to be balanced and operating in Category 1.

The specification may be implemented as a database or lookup table that stores thresholds in association with Category 1, Category 2, and/or Category 3. The example discussed above related to the amplitude of the $5^{th}$ harmonic voltage spectrum relates to the electrical apparatus 210 being in Category 1. In another example, the electrical apparatus 210 is in Category 2 (unbalanced condition but not single-phase). In this example, the specification includes a threshold value for the amplitude of the $5^{th}$ harmonic of the voltage frequency spectrum in each phase a, b, c. In other words, the amplitude of the $5^{th}$ harmonic is extracted from each of Vfa, Vfb, Vfc, and each of these extracted amplitudes is compared to a separate threshold. The separate thresholds may all have the same value or they all may have different values. For example, the separate thresholds may all be 5 V, or the separate thresholds may each have a different value. In these implementations, the electronic storage 232 includes logic or instructions that declare that a performance condition exists if the amplitude of the harmonic of interest (the $5^{th}$ in this example) is less than the threshold for that phase. For example, a performance condition may be declared to exist if two of Vfa, Vfb, Vfc have an amplitude of the harmonic of interest that is less than the threshold for the associated phase.

Moreover, the specification may store different thresholds that are applicable to single-phase operation (Category 3). In single-phase operation, all of the current in the electrical apparatus flows through two of the input nodes 214a, 214b, 214c. Thus, the amplitudes of the harmonics of the voltage spectrum for two of the signals Vfa, Vfb, Vfc are very low (indicating very high current flow in the case of a "stiff grid"), or relatively high (indicating the case of a "weak grid"), and the amplitude of the harmonics of the third phase voltage spectrum is zero, since there is no current flowing in that phase. In this example, the specification may include a threshold that indicates if the system is a stiff grid or a weak grid. The amplitude of the harmonic of interest in each of Vfa, Vfb, Vfc is compared to the threshold and a performance condition is declared or not declared based on the outcome.

The example above discusses a threshold that is a single value (for example, 5 V) associated with a single harmonic in the voltage spectrum. However, the specification may include thresholds that include many values or many ranges of values, each of which is associated with a different criteria. For example, the specification may include a range of values that each represent acceptable amplitudes for one of a plurality of harmonic components. The specification may include a range of values that represent an acceptable amount of THD. Furthermore, the specification may include ranges of values that represent unacceptable amount of a particular criterion.

Furthermore, more than one criterion may be used to determine whether the performance condition exists. For example, the amplitudes for the fifth, seventh, eleventh, and/or or thirteenth harmonics may be properties of the frequency content. Each of these harmonics may be compared to a threshold value associated with that harmonic. If two of the three harmonics exceed their threshold but one does not exceed the threshold, a performance condition may still be deemed to exist. For example, the electronic storage 234 may store rules that indicate that if a majority of determined harmonics exceed the respective threshold in one or more phases, then a performance condition exists. Furthermore, the rules may include specific rules for each of the Categories 1, 2, and 3. Using more than one criteria may enhance the accuracy of the process 500, avoid false alarms, and improve the overall performance of the system 200.

The specification is stored on the electronic storage 234. The values that are associated with the criterion or criteria that collectively make up the specification may be entered by the manufacturer at the time of assembling and programming the control system 230. For example, the manufacturer may test the electrical apparatus 210 under various conditions and determine the values for the specification based on the test results. The various conditions include connection to power distribution networks of different SCCR. For example, the specification may include various thresholds that are each based on test results obtained while the electrical apparatus 210 is connected to a 100 kA network, a 5 kA network, a 20 kA network, and a 50 kA network. The specification alternatively or additionally may include thresholds that are based on high input currents that may flow in one or more of the input nodes 214a, 214b, 214c when the electrical apparatus 210 has a voltage imbalance.

The manufacturer may use the same values for all electrical apparatuses of a particular type (for example, all VFDs or UPS of a particular model) at a particular load, or the electrical apparatus 210 may be individually tested with a known load. In some implementations, the specification is updated during the lifetime of the electrical apparatus 210. For example, the control system 230 may be configured to permit the operator to add new values and/or new criteria to the specification through the I/O interface 236, or the manufacturer may push updates to the control system 230.

Furthermore, in some implementations, the frequency-based properties of one phase are compared to the same frequency-based properties of the other phases. For example, if an unbalanced condition exists based on (515), the frequency content of each phase is different and the frequency-based properties are also different. Thus, when an unbalanced condition exists, comparing the same frequency-based property among different phases provides more information about the condition of the electrical apparatus 210. In these implementations, the frequency-based properties of each phase also may be compared to the specification.

If a performance condition exists, a flag or other indication may be stored on the electronic storage 234.

The control system 230 assesses whether a performance condition exists (550) based on the determination made in (540). For example, the control system 230 may determine whether or not a flag was set in (540). If a performance condition does not exist, the process returns to (510) and continues to perform (510)-(540) during operation of the electrical apparatus 210. If a performance condition exists, then the control system determines whether or not the load 202 on the electrical apparatus 210 may be reduced (560). Reducing the load 202 on the electrical apparatus 210 results in the input currents ia, ib, ic being lower and thus reduces the stress on the components in the rectifier 217 and DC link 218. Thus, reducing the load 202 on the electrical apparatus 210 may correct or compensate for the performance condition.

Whether or not the load 202 on the electrical apparatus 210 may be reduced depends on the application that uses the electrical apparatus 210 and the nature of the load 202. For example, the load 202 may be a three-phase motor that drives a fan for a heating and ventilation system. In these implementations, the load 202 may be reduced by reducing the speed of the motor, which reduces the speed of the fan. Reducing the speed of the motor by a small amount may impact the performance of the heating and ventilation system (by reducing the speed of the fan) but is unlikely to cause the heating and ventilation system to malfunction or shut down. In another example, the load 202 may again be a motor, but the motor is used to move a portion of a fast-moving conveyor belt. Reducing the load 202 would reduce the speed of the motor, and is not practicable in this scenario.

Information related to whether or not the load 202 may be reduced may be stored on the electronic storage 234, and the control system 230 determines whether or not to reduce the load 202 based on the information. For example, the operator may specify that the load 202 may be reduced or may not be reduced. In other implementations, the manufacturer may program the control system with a list of possible applications and associate each possible application with an indication of whether or not the load 202 may be reduced. The operator is able to select the application from a menu presented at the I/O interface 236. In these implementations, the control system 230 determines whether or not to reduce the load 202 based on the pre-programmed setting for the operator's application.

If the load may be reduced, the control system 230 reduces the load 202 (570). The load 202 may be reduced by, for example, reducing the current and/or voltage provided to the load 202. Moreover, if the load 202 is reduced at (570), the control system 230 may increment a counter that tracks how often the load 202 has been reduced. The process then returns to (510). The process 500 thus continues to monitor the input voltages at the input nodes 214a, 214b, 214c. If the load reduction was insufficient to correct the performance condition, and the counter indicates that the load 202 has been reduced previously, the control system 230 may determine that the load 202 cannot be reduced at (560).

If the load 202 may not be reduced, the control system 230 disconnects the electrical apparatus 210 from the distribution network 201. For example, the control system 230 may switch off the inverter 219 or cause a fuse between the input nodes 214a, 214b, 214c and the distribution network 201 to operate.

Accordingly, control system 230 is capable of determining whether potentially damaging situations (such as overcurrent) that may occur when the electrical apparatus 210 is used in a typical situation in which the voltage inputs are balanced, and the control system 230 also is capable of determining whether a potentially damaging overcurrent situation related to an unbalanced condition (such as a single-phase condition) exists.

Other implementations are within the scope of the claims. For example, the rectifier 217 is shown as a 6-diode rectifier. However, other implementations are possible. For example, the rectifier 217 may be made with 12 or 18 diodes. The process 500 is discussed in the context of a three-phase system, but may be used in a single-phase application or may be used to analyze a single phase of a multi-phase system.

What is claimed is:

1. An electrical apparatus configured to electrically connect to a multi-phase alternating current (AC) electrical power distribution network, the electrical apparatus comprising:
   an input electrical network comprising: a plurality of input nodes, each configured to electrically connect to one phase of the multi-phase AC electrical power distribution network;
   at least one non-linear electronic component electrically connected to the input electrical network;
   an impedance network electrically connected between the input electrical network and ground; and
   a control system configured to:
      access a voltage signal that represents a voltage over time at the input electrical network;
      determine a frequency content of the voltage signal;
      determine a property of the frequency content; and
      determine whether an input current performance condition exists in the electrical apparatus based the property of the frequency content.

2. The electrical apparatus of claim 1, wherein, if an input current performance condition exists in the electrical apparatus, the control system is further configured to reduce an amount of power provided to a load that is electrically connected to the electrical apparatus.

3. The electrical apparatus of claim 1, wherein, if an input current performance condition exists in the electrical apparatus, the control system is further configured to disconnect the electrical apparatus from the electrical power distribution network.

4. The electrical apparatus of claim 1, wherein the determined frequency content comprises one or more harmonic components of the voltage signal, and the property of the frequency content comprises an amplitude of the one or more harmonic components of the voltage signal.

5. The electrical apparatus of claim 1, wherein the determined frequency content comprises one or more harmonic components of the voltage signal, and the property of the frequency content comprises a sum of values that are each based on an amplitude of the one or more harmonic components of the voltage signal.

6. The electrical apparatus of claim 5, wherein the property comprises a total harmonic distortion.

7. The electrical apparatus of claim 1, wherein to determine whether an input current performance condition exists based on the property of the frequency content, the control system is configured to compare the property of the frequency content to a specification, and the input current performance condition exists if the property does not meet the specification.

8. The electrical apparatus of claim 7, wherein the control system is configured to determine more than one property of the frequency content, the control system is configured to compare all of the more than one properties of the frequency content to the specification, and the input current performance condition exists if at least one property does not meet the specification.

9. The electrical apparatus of claim 1, wherein
   the impedance network comprises a plurality of impedance assemblies, and one of the impedance assemblies is electrically connected between ground and each of the plurality of input nodes, and
   the control system being configured to accessing a voltage signal comprises the control system being configured to access a voltage signal at each of the plurality of input nodes and being configured to determine the frequency content of the voltage signal at each of the plurality of input nodes.

10. The electrical apparatus of claim 9, wherein the control system is further configured to compare the voltage signal at each input node to the voltage signals at all of the other input nodes and to determine whether an unbalanced condition exists based on the comparison.

11. The electrical apparatus of claim 1, wherein the electrical apparatus comprises: a variable speed drive (VFD) configured to control a torque and speed of an electric machine or an uninterruptable power supply (UPS) configured to power a non-machine load.

12. The electrical apparatus of claim 1, wherein the at least one non-linear electrical component comprises a plurality of diodes configured as a rectifier.

13. A method of protecting an electrical apparatus that is electrically connected to more than one phase of a multi-phase electrical power distribution network, the method comprising:
   accessing information related to an input voltage at each phase of the electrical apparatus;

analyzing the information related to the input voltage at each phase to determine a frequency content of the input voltage at each phase;

determining at least one property of the frequency content of the input voltage at each phase;

determining whether an input current performance condition exists in the electrical apparatus based on the determined at least one property of the frequency content of the input voltage at each phase; and if an input current performance condition exists, reducing electrical power provided to a load coupled to the electrical apparatus or disconnecting the electrical apparatus from the power distribution network.

14. The method of claim 13, further comprising comparing the information related to the input voltage at each phase to the information related to the input voltage of each of the other phases to determine whether an unbalanced condition exists.

15. The method of claim 13, wherein determining whether an input current performance condition exists comprises comparing the determined at least one property for each phase to a threshold associated with that phase.

16. A multi-phase electrical apparatus configured to electrically connect to a multi-phase AC electrical power distribution network and to provide a driver signal to a load, the electrical apparatus comprising:

an electrical network comprising:

a plurality of input nodes, each input node configured to electrically connect to one phase of the multi-phase electrical power distribution network; and a converter configured to convert AC electrical power to direct-current (DC) electrical power, the converter comprising at least one non-linear electronic component; and an impedance network comprising a plurality of impedance assemblies, wherein each impedance assembly is electrically connected between one of the input nodes and ground.

17. The multi-phase electrical apparatus of claim 16, further comprising a control system configured to:

access a voltage signal at each input node, each voltage signal representing a voltage over time at one of the input nodes;

determine a plurality of frequency representations, each frequency representation comprising a frequency content of one of the accessed voltage signals; and determine whether an input current performance condition exists in the electrical apparatus based on the frequency representations.

18. The multi-phase electrical apparatus of claim 17, wherein the control system is further configured to determine whether an unbalanced condition exists based on the accessed voltage signals.

19. The multi-phase electrical apparatus of claim 18, wherein, if an input current performance condition exists, the control system is further configured to reduce power to the load or to disconnect the load.

* * * * *